Jan. 1, 1929.
C. S. SNAVELY
1,697,668
LIGHT SIGNAL
Filed March 8, 1923
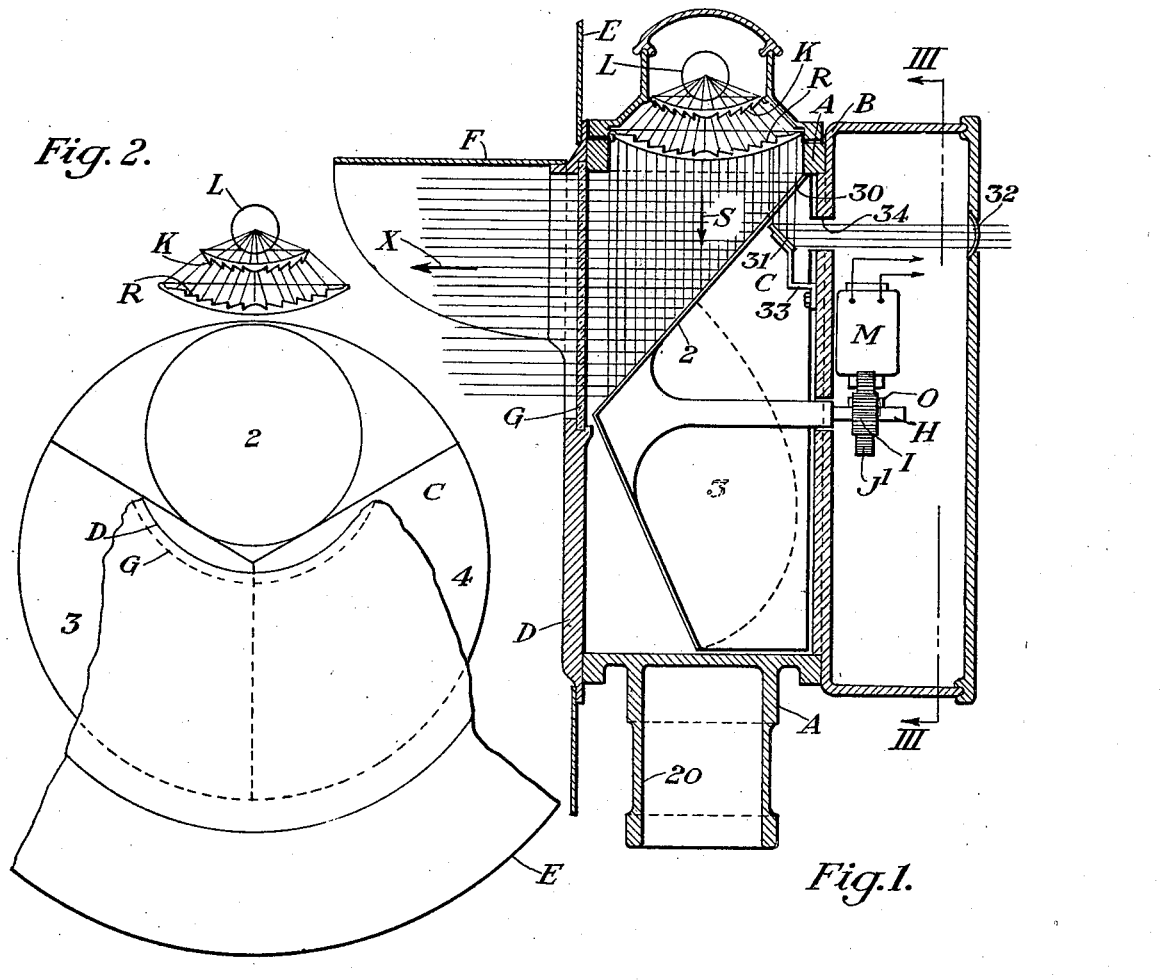
Fig. 2.
Fig. 1.
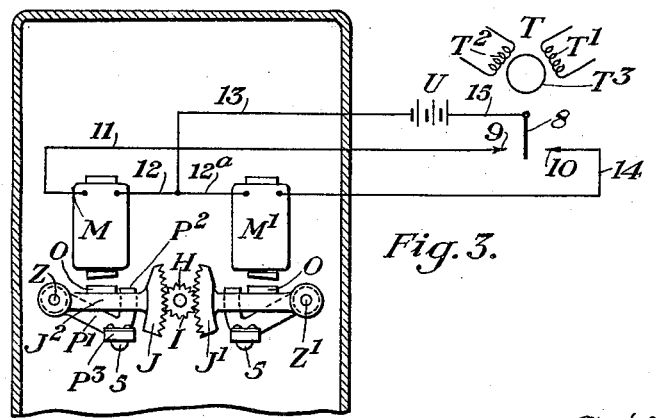
Fig. 3.
INVENTOR:
C. S. Snavely,
BY A. L. Vencill
His ATTORNEY Patented Jan. 1, 1929.

1,697,668

UNITED STATES PATENT OFFICE.

CLARENCE S. SNAVELY, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

LIGHT SIGNAL.

Application filed March 8, 1923. Serial No. 623,756.

My invention relates to light signals, and has for an object the provision of a signal capable of selectively projecting a plurality of beams of light of different colors from a single light source.

I will describe one form of light signal embodying my invention, and will then point out the novel features thereof in claims.

In the accompanying drawings, Fig. 1 is a view showing in vertical longitudinal section one form of light signal embodying my invention. Fig. 2 is a diagrammatic front view of the signal shown in Fig. 1 and illustrating the optical principle used in my invention. Fig. 3 is a sectional view on the plane III—III in Fig. 1 showing one form of apparatus for rotating the light deflecting device of the signal shown in Fig. 1.

Similar reference characters refer to similar parts in each of the three views.

Referring first to Fig. 1, the signal comprises a suitable casing A which contains the operating mechanism of the signal and is provided with a socket 20 for mounting, as on a mast. Supported by this casing is a front plate D having an aperture equipped with a transparent cover glass G, through which the signal indication is displayed. A shield F of suitable shape protects this cover glass from the direct rays of the sun and thus reduces possible glare from surface reflection. Surrounding the casing A and supported thereupon is a screen E, preferably of sheet metal and usually, though not necessarily, painted black, one function of which is to provide a uniform background for observing the signal indication and thus increase its visibility. An electric lamp L is supported in the casing A and is provided with a pair of uncolored lenses K and R which project a beam of parallel rays of light from lamp L in the direction shown by arrow S, Fig. 1. Secured to the rear of the casing A is a mechanism box B which contains certain mechanism which I will describe in detail hereinafter. Suitably journalled in the back wall of casing A and extending threthrough is a shaft H. Rigidly attached to this shaft and operated thereby is a light deflector C which comprises a pyramid-shaped member having three light deflecting surfaces 2, 3, and 4. These surfaces may be prismatic or may be as shown in the drawing, simply plane reflecting surfaces.

These reflecting surfaces are so disposed that any one may be so placed that the beam of parallel rays of light from the lamp L, incident upon such a surface is redirected in a new direction along the arrow X through the cover glass G. The deflector C is capable of being moved by means of the mechanism referred to above, to three positions, in which the three reflecting surfaces 2, 3, and 4, respectively, are located properly for reflecting the incident beam from the lamp L through the cover glass G.

The reflecting surfaces 2, 3 and 4 are differently colored so that beams of different colors are projective from the signal depending on which of the surfaces is deflecting the light. For example, in the practical application of my invention to railway signaling, the deflector C is biased to such a position that the reflecting surface 2 is in operative relation with the light L. The material of this surface is colored red so the projected beam of light is red indicating "stop". In a similar manner the surface 3 is colored green and the surface 4 is colored yellow to indicate "proceed" and "caution" respectively by the corresponding colors of the emitted beams. The signal is mounted in such position that the projected beam is directed toward the point or points from which the signal indication is to be observed.

It should be noted that the beam projected from the signal is in each case composed of parallel rays of light of a color corresponding to the reflecting surface then associated with the lamp L, and that the beam is projected in a given direction from a given area through the same cover glass, irrespective of the indication displayed.

Referring now to Fig. 3 the operating mechanism for the movable deflector C comprises two electromagnets M and M'. Rigidly secured to the shaft H of the deflector C is a pinion I which meshes with two segment gears J and J'. These segment gears are pivoted at their ends as shown at Z and Z'. Each segment gear is provided with an armature which is drawn upward when the associated magnet is energized thus turning the segment gear about its axis and rotating the deflector C by means of the shaft H. As shown in the drawing, the parts are in the normal position, that is, the deflector C is in such a position that the signal is projecting a red beam of light, both magnets being de-energized. The segment gear J is provided with a floating weight $P^3$. When magnet M is de-energized this weight forces the segment J downward until such weight engages a stop 5. Motion of the segment below the point at which such weight engages stop 5 causes no motion of this weight but when magnet M is energized and tends to lift the segment gear the weight is also lifted. A similar weight is provided for the segment gear J'. It is therefore clear that when both weights $P^3$ rest on their associated rests 5, the system is in equilibrium and that when either magnet M or M' is energized the consequent motion of the associated segment gear and the pinion I is accomplished against the biasing action of gravity on the weights $P^3$. The energization of the magnets M and M' is controlled by any suitable means such for instance as a relay T having two windings $T^2$ and T', which may be controlled in any suitable manner as is well known to those skilled in the art. This relay is provided with a rotor $T^3$ and a movable contact finger 8 controlled thereby. The circuit for magnet M is from a source of energy as a battery U, through wire 15, contact 8—9 of relay T, wire 11, winding of magnet M, and wires 12 and 13, back to the battery U. The magnet M is energized, therefore, only when the relay T is energized in such direction as to swing its contact finger 8 to the left. The circuit for magnet M' passes from battery U, through wire 15, contact 8—10 of relay T, wire 14, winding of relay M', and wires $12^a$ and 13, back to battery U. Magnet M' is accordingly energized only when relay T is energized in such a direction as to swing its contact finger 8 to the right. When relay T is de-energized, both magnets M and M' are de-energized.

When magnet M is energized, armature O is caused to move upwards thus turning segment gear J about its axis in a counter clockwise direction as viewed in Fig. 3, thus moving reflecting surface 4 into operative relation with respect to lamp L and causing a beam of yellow light to be projected through the cover glass G. In a similar manner when magnet M' is energized shaft H is rotated in the other direction thus projecting a beam of green light through the cover glass G. When both magnets are de-energized however the weights $P^3$ cause the apparatus to assume the position shown in the drawing thus projecting a red light through the cover glass G. Under certain circumstances it is desirable that an observer, stationed at a point in rear of the signal as for example on a train which has passed the signal moving in the direction in which the signal governs, be able to ascertain whether the signal is displaying a stop indication.

As shown in the drawing this is accomplished as follows: The reflecting surface 2 which is operative to produce a stop indication, is provided with an aperture 30. The front and back walls of the mechanism are also provided with aligned openings 32 and 34 respectively, and a small mirror 31 is so disposed that light projected from lamp L through this aperture is redirected toward the rear of the signal through the openings 32 and 34 in the mechanism case and is thus made visible to an observer in rear of the signal. It is clear that this light is visible only when reflecting surface 2 is in operative relation with respect to lamp L and when lamp L is lighted.

Although I have herein shown and described only one form of light signal embodying my invention, it is understood that various changes and modifications may be made therein within the scope of the appended claims without departing from the spirit and scope of my invention.

Having thus described my invention, what I claim is:

1. A light signal comprising a single source of light, means for projecting a beam of parallel rays from said source, a light deflecting member in the form of a pyramid the sides of which constitute light deflecting surfaces each arranged to impart a distinctive color to light incident thereon, and means for rotating said member to selectively interpose any one of said surfaces in the path of said beam for projecting a beam of parallel rays of distinctively colored light from said signal.

2. A light signal comprising a single source of light, means for projecting a beam of parallel rays from said source, a light deflecting member in the form of a pyramid the sides of which constitute distinctively colored light deflecting surfaces, said member being mounted on an axis substantially at right angles to the incident rays from said source, and means for rotating said member to selectively deflect rays from any one of said surfaces onto a common area.

3. A light signal comprising a rotatable member having a plurality of distinctively colored light deflecting surface inclined at equal angles with the axis of rotation of the member, a single source of light, means for projecting a beam of parallel rays from said source toward said member at right angles with said axis, and means for rotating said member about said axis to selectively interpose only one of said surfaces in said beam for projecting a beam of distinctively colored light from the signal in a direction parallel with said axis.

In testimony whereof I affix my signature.

CLARENCE S. SNAVELY.